(12) United States Patent
Trimborn et al.

(10) Patent No.: US 8,752,894 B2
(45) Date of Patent: Jun. 17, 2014

(54) BASE BODY OF A HEADREST OF A VEHICLE SEAT

(75) Inventors: Ralf Trimborn, Wuppertal (DE); Rolf Steinmetz, Düsseldorf (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 329 days.

(21) Appl. No.: 13/026,118

(22) Filed: Feb. 11, 2011

(65) Prior Publication Data

US 2011/0198900 A1    Aug. 18, 2011

(30) Foreign Application Priority Data

Feb. 12, 2010  (DE) .......................... 10 2010 001 908

(51) Int. Cl.
*B60N 2/42*    (2006.01)

(52) U.S. Cl.
USPC ...................................... 297/216.12; 297/391

(58) Field of Classification Search
USPC ...................................... 297/216.12, 391, 404
See application file for complete search history.

(56) References Cited

U.S. PATENT DOCUMENTS

| | | | |
|---|---|---|---|
| 4,991,907 A | 2/1991 | Tanaka | |
| 6,416,125 B1* | 7/2002 | Shah et al. | ............... 297/216.12 |
| 6,634,715 B2 | 10/2003 | Nakane et al. | |
| 7,926,871 B2* | 4/2011 | Meixner et al. | .......... 297/216.12 |
| 2007/0035163 A1* | 2/2007 | Andrews | ................... 297/216.12 |
| 2008/0191522 A1* | 8/2008 | Maeda et al. | ............. 297/216.12 |
| 2009/0121526 A1* | 5/2009 | Akaike et al. | ............. 297/216.12 |
| 2009/0315372 A1* | 12/2009 | Tracht | ....................... 297/216.12 |
| 2010/0072795 A1 | 3/2010 | Meixner et al. | |

FOREIGN PATENT DOCUMENTS

| | | |
|---|---|---|
| DE | 39 24 936 A1 | 2/1990 |
| DE | 195 09 014 A1 | 9/1996 |
| DE | 197 46 413 A1 | 4/1998 |
| DE | 101 09 655 A1 | 9/2001 |
| DE | 100 45 070 B4 | 1/2006 |
| DE | 10 2005 024 294 A1 | 11/2006 |
| DE | 10 2005 030 313 A1 | 12/2006 |

* cited by examiner

*Primary Examiner* — David R Dunn
*Assistant Examiner* — Alexander Harrison
(74) *Attorney, Agent, or Firm* — Flaster/Greenberg P.C.

(57) ABSTRACT

The invention relates to a base body of a headrest of a vehicle seat having a base, particularly for receiving headrest carriers for arranging the headrest at a vehicle seat, and a support body having a support surface for a head. In order to provide a base body for a headrest and a headrest, which in the case of a crash reduces the risk of cervical spine injuries, it is provided that the support body is connected to the base such that the support surface is elastically adjustable relative to the base.

13 Claims, 2 Drawing Sheets

BASE BODY OF A HEADREST OF A VEHICLE SEAT

BACKGROUND OF THE INVENTION

1. Field of the Invention

The invention related to a base body of a headrest of a vehicle seat having,

- a base, particularly for receiving headrest carriers for disposing the headrest on a vehicle seat, and
- a support body having a support surface for a head.

2. Description of the Related Art

Base bodies of the initially named type as well as headrests produced from them are well known from the prior art. Along with a comfort function in normal vehicle operation, headrests further also satisfy a safety function. The safety function is to avoid or to reduce cervical vertebrae injuries, especially the risk of frequently occurring whiplash due to a hyperextension and overstressing of the cervical spine and supporting muscles. The injuries resulting from the lash effect are also known by the term "whiplash".

Along with a hyperextension of the cervical spine, caused by the backward head motion in the case of a rear collision, the further danger exists that the head, lying against the headrest in the course of the accident, after attaining a maximum of an also occurring rearward displacement of the seatback, is accelerated again by the headrest in the direction towards the front of the vehicle. This so-called head rebound velocity (HRV) effect, that is, the negative acceleration effect, involves the danger of a cervical spine injury, in addition to the whiplash effect.

To avoid injuries to the cervical spine, already so-called crash active headrests are disclosed in which during normal driving operation the distance between the head and the headrest is relatively large in comparison to conventional, inactive headrests. In the case of a rear collision, the headrest undergoes a sensor controlled displacement in the drive direction, i.e. in the direction of the head. As a result, the distance between the headrest and the head is reduced which then avoids a hyperextension of the cervical spine. The vehicle manufacturer's changed design specifications which intend a reduction of the distance between the headrest and the head in normal driving operation, largely limit the application area of such active headrests which require a minimum distance, such that alternative solutions are necessary.

BRIEF SUMMARY OF THE INVENTION

The object of the invention is to provide a base body for a headrest and a headrest which reduces the risk of cervical spine injuries in the case of a crash.

The invention solves the object by a base body having the feature of claim 1 and a headrest with the features of claim 12. Advantageous further developments of the base body are given in the dependent claims 2 to 11.

It is characteristic for the inventive base body that the support body of the base body is connected to the base in such a way that the support surface is elastically adjustable relative to the base. According to the invention, the base body comprises two areas. One area is a frame structure forming a base, which is suitable for the arrangement and receiving of mounting parts and upholstery, and the other is a support body which is elastically adjustable relative to the base and comprises the support surface which in normal driving operation, however, particularly in the case of a rear collision, acts together with the head.

The elastic adjustability of the support body with respect to the base body is used in the case of a rear collision to dampen the movement of the head that is possibly coming into contact at the support surface of the base body, by an elastic adjustment of the support surface in the direction of the base. The adjustability of support surface, which is preferably disposed centrally on the base body, permits the occurring kinetic energy to be dissipated due to the elastic deformation. The generated energy is absorbed, whereby the head is gently slowed down. Furthermore, a high negative acceleration of the head due to the HRV effect is prevented or excluded. After the absorption process takes place in the elastic area, namely by a displacement of the support surface relative to the base, no permanent deformation of the headrest or of the base body occurs so that a replacement of the base body after an accident can be omitted.

The arrangement of the headrest with respect to the base, such that the headrest is elastically adjustable with respect to the base, can in principle occur arbitrarily. However, according to a particularly advantageous embodiment of the invention, the base and the headrest are connected together via at least one, preferably two, elastically deformable deformation elements. This embodiment of the invention and in particular the use of two elastically deformable deformation elements permits the design of the support body to be designed independently of its material properties or of those of the base. The elasticity of the support body with respect to the base can be determined solely by the selection of the deformation elements, which due to their ability to deform in the case of a rear collision, in cooperation with the head, permit an adjustment of the support body relative to the base. In particular, the use of two deformation elements makes it possible to guarantee a uniform, elastic adjustment movement of the support body that at the same time holds the head stable. The deformation elements are disposed particularly advantageously at opposite ends of the support body, whereby an additional stabilization of the head is attained in the case of a rear collision.

The design of the base body, especially the connection of the support body to the base can, in principle, be chosen freely. In the case of multi-part design of the base body, therefore, the base, the support body and possibly the deformation elements can be selected according to the required properties, where these components are then connected together in a suitable manner. However, according to a particularly advantageous embodiment of the invention, the support body and the base, or the base, the support body and the deformation element are formed integrally. This design of the base body is characterized in that it can be produced particularly simply and cost-effectively. Because an assembly of the base body is possibly completely obviated, only a minor assembly effort for manufacturing the headrest is required.

The design of the deformation elements such that they comprise the necessary elasticity, can also be freely selected, as already stated above. However, according to a particularly advantageous design, the deformation elements comprise recesses. The arrangement of recesses, both in an integrally formed base body, as well as in a multipart base body, makes it possible to determine the elastic properties of the base body or the adjustability of the support body with respect to the base via a design of the recesses. In addition the arrangement of the recesses permits a weight reduction of the base body which contributes to a reduction of the overall weight of the headrest. The deformation element can comprise one or more recesses, depending on the design specifications.

The fundamental strength properties of the base body, particularly in normal driving operation, are given by the strength of the base body. For this purpose, the base must be dimensioned so that even in the case of a rear collision it guarantees that the base remains stable with respect to the elastically adjustable support body. Along with the fundamental possibility to determine the strength via the constructive design and the material selection, according to a further design of the invention the base comprises a support structure constructed by webs, particularly, transverse webs and/or longitudinal webs. The use of appropriate webs makes it possible to confer a sufficient strength to the base, which results at the same time in low weight of the base body. In principle, the arrangement of webs can be selected freely, preferably depending on the connection of the base body to a vehicle seat.

According to a further design of the invention, the support body comprises reinforcing elements, in particular longitudinal and/or transverse ribs. The reinforcing elements of the support body guarantee sufficient stability of the support surface, and in addition prevent their collapse, so that in the case of a rear collision the safety function of a headrest produced using the base body, is guaranteed particularly reliably. In addition, with an appropriate design and arrangement of the reinforcing elements, the support body can be constructed so that along with the elastic adjustability with respect to the base, it is elastically deformable in itself in the case of a rear collision, wherein the shape arising in the interaction with the head is adapted to the head shape, and thus acts stabilizing on the head. As also in the case of the use of webs for the base, also the arrangement of the reinforcing elements can, in principle, be freely selected depending on the design specifications.

The fundamental arrangement of the first support body relative to the base is based on the manufacturers' design specifications, where the goal is to provide the widest possible support surface in order to guarantee in the case of a rear collision an interaction of the support surface with the head in an especially reliable manner. According to a particularly advantageous design of the invention, a second support body is disposed elastically adjustable relative to the base, at the base in an offset from the first support body, preferably in the mounting position above the first support body. This design of the invention additionally increases the safety function of a headrest produced from the base body. The second support body acts in a supplemental manner for dissipating the kinetic energy, and in interacting with the first support body stabilizes the head during interaction with the base body. The arrangement of the second support body can be selected freely, and can be selected corresponding to the design specifications. However, the second support body is particularly advantageously disposed in the mounting position above the first support body, whereby in addition during the course of the accident an acceleration of the cervical spine causing a whiplash injury is prevented.

The arrangement of the second support body at the base can also occur arbitrarily just as the arrangement of the first support body at the base. However, according to a particularly advantageous design the second support body is formed integrally with the base. This design of the invention guarantees a simple production of the headrest formed out of the base body, even in the case of a complex construction of the base body with two support surfaces. The assembly effort required otherwise for assembling the base body can be omitted. The integral formation guarantees a particularly good stability and high functional safety.

According to an advantageous further development of the invention, the second support body and the base are connected together via a deformation element. In the same way as with the connection of the first support body to the base, the second support body can be connected to the base also via a deformation element, wherein in this case also, the use of multiple deformation elements is conceivable. The deformation element(s) guarantee the elastic adjustability of the support body that in this case can even be formed rigid, relative to the base. The design of the second support body can also, as with the first support body, be constructed adjustable relative to the base, independently of its suitability, for example resulting from the material properties, for elastic adjustability.

As already represented above, the base body can, in principle, be constructed in any manner. Thus, it can be constructed integrally, or of multiple parts. Likewise, the material selection for producing the base body or the components of the base body can be selected freely depending on the required properties of the base body or the components. However, according to a particularly advantageous design of the invention, the base body is constructed from a plastic, and particularly from a plastic without glass fibers. The use of a plastic makes it possible to produce this in a particularly simple and cost-effective manner, particularly integrally, for example by plastic injection molding. As a result, inexpensive series production is possible, which in turn enables cost effective production of a headrest produced from the base body.

An advantageous further development of the invention, according to which receptacles for mounting the headrest support are integrally formed on the base, has an additional cost reducing effect. The headrest supports serve for arranging the base body and the headrest produced from the base body on the seat back. As a rule, the headrest supports are spars, which permit, for example through openings in the seat back, an arrangement of the headrest on the vehicle seat. The arrangement of the receptacles, in the case of the production out of plastics the molding of the receptacles to the base, permits a particularly simple arrangement of the headrest support on the base which moreover can be produced particularly cost-effectively.

Characteristic for the headrest according to the invention is that the base body is constructed according to one or more of the claims 1 to 11. A headrest according to the invention comprises the advantage that it reduces or completely prevents in particular the occurring HRV stresses particularly with respect to known headrests. In addition, the headrest according to the invention can be produced particularly cost-effectively.

BRIEF DESCRIPTION OF THE SEVERAL VIEWS OF THE DRAWINGS

An exemplary embodiment of the invention is explained in the following with reference to the drawings. The drawings show.

DETAILED DESCRIPTION OF THE INVENTION

Figure 1:
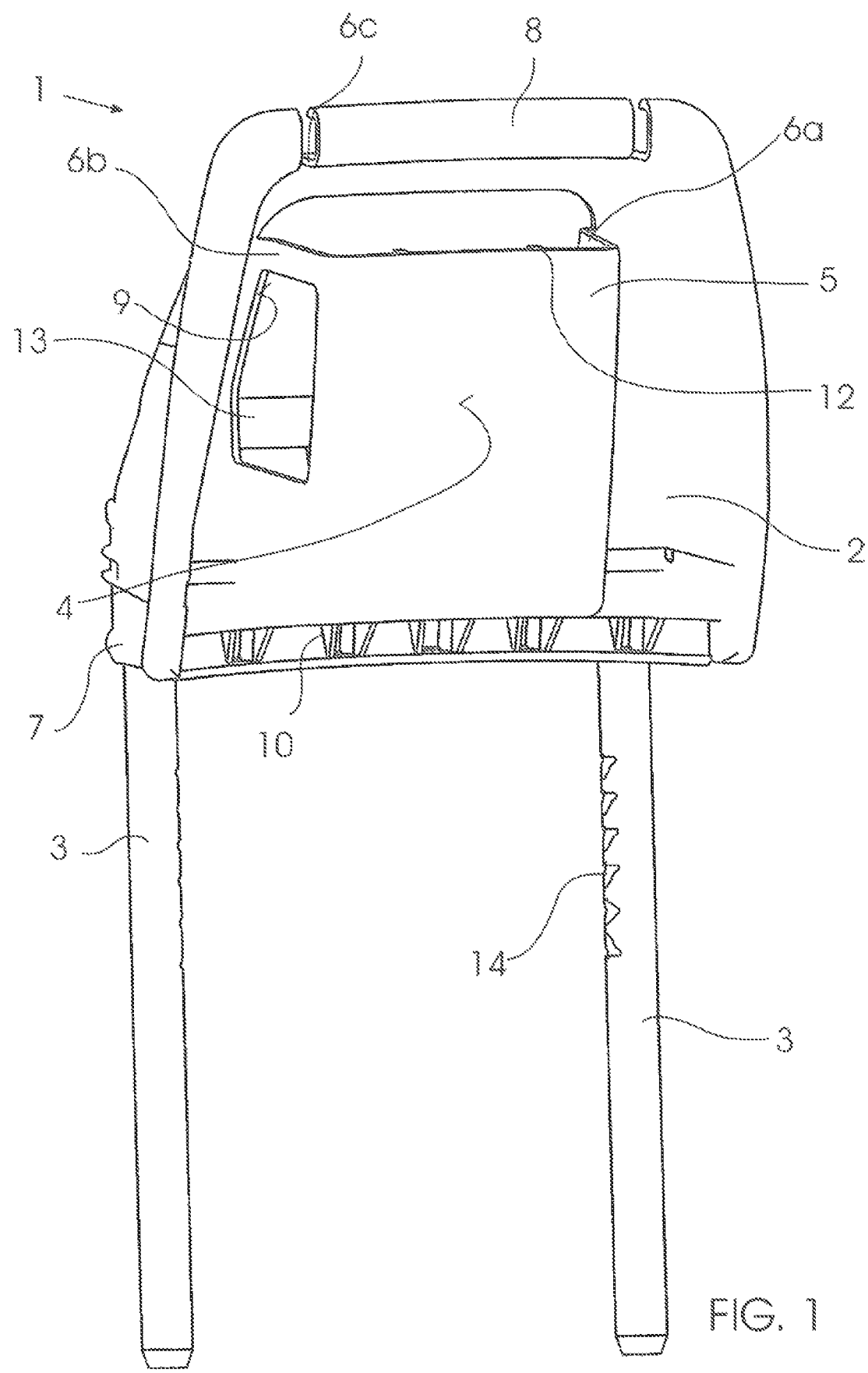
FIG. 1: a perspective view of a base body with headrest supports in normal driving operation.

FIG. 1 shows a perspective representation of the base body 1 of a headrest having headrest supports 3 disposed at the base body 1. The headrest supports 3 comprise two spars which are connected together in the area of the base body 1 via a transverse web 13. The headrest supports 3 are disposed in receptacles 7 formed at the rear, relative to the illustrative representation, of the base body 1 integrally produced from a plastic body.

The transverse web 13 confers an increased stability to the headrest supports 3, and also to the base body 1. For securing the position of the headrest with respect to the seat back, the headrest supports 3 further comprise detents 14 which interact with corresponding latching elements at the seat back.

The base body 1 comprises essentially two areas, namely a base 2, which is connected to the headrest supports 3, and a support body 5, which is disposed in front of the base 2 relative to the drawing plane. A third area of the base body 1 is formed by a second support body 8 disposed above the first support body 5, that is, in an area of the base 2 opposite the headrest supports 3. This and the first support body 5 are connected to the base 2 via deformation elements 6a, 6b, 6c, wherein the deformation elements 6a, 6b connecting the first support body 5 to the base 2 comprise window-like recesses 9, which determine an elastic adjustability of the first support body 5 relative to the base.

Figure 2:
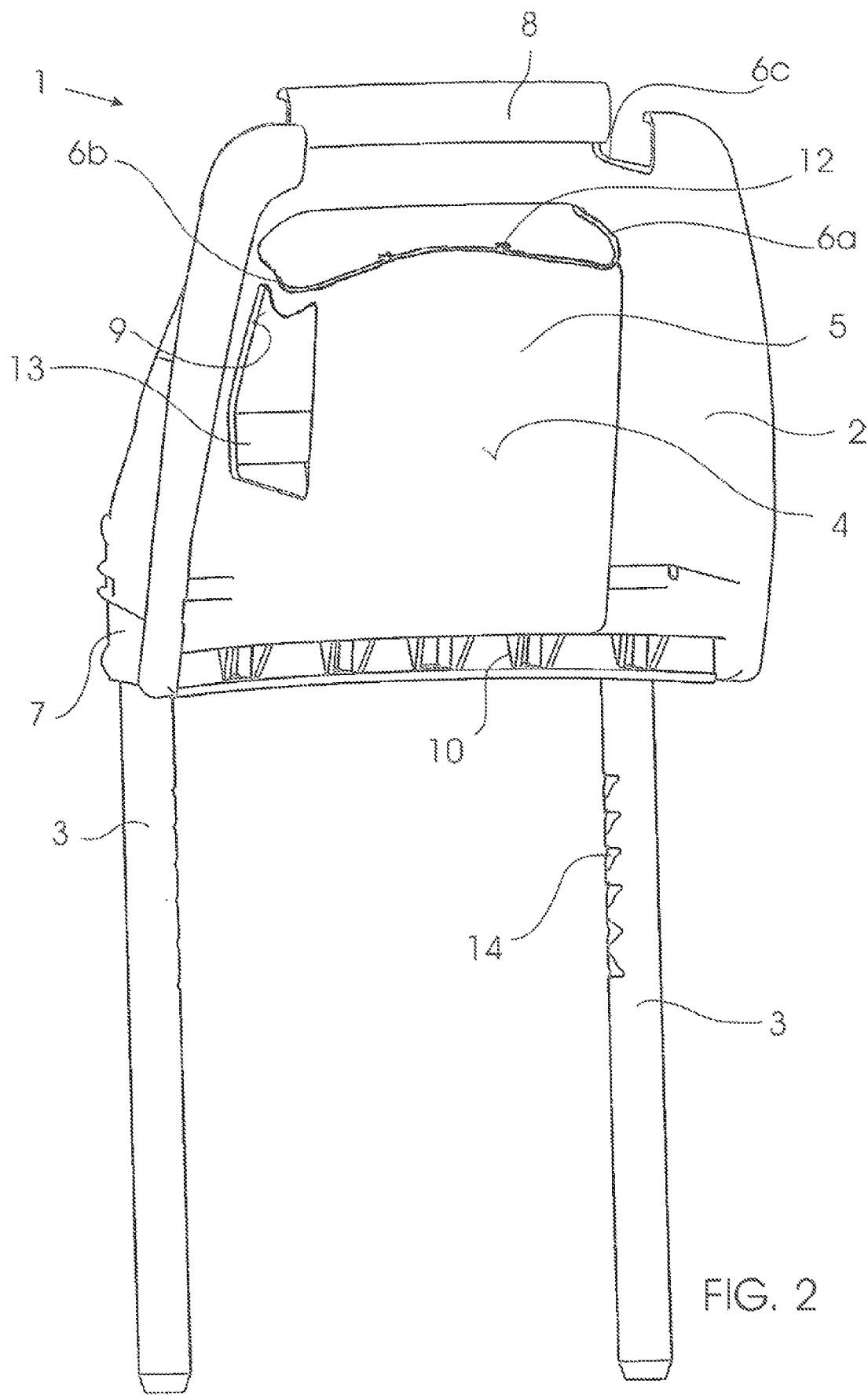
FIG. 2: a perspective view of the base body from FIG. 1 during the course of an accident.

In the case of an accident, a head, not represented here, comes into contact with a support surface 4 of the first support body 5 and with the support body 8. The acceleration of the head, arising during a rear collision, in the direction of the headrest produced from the base body 1, causes an adjustment of the first support body 5 and the second support body 8 into the position represented in FIG. 2 due to the elastic deformability of the deformation elements 6a, 6b, 6c. The elastic displacement of the base bodies 5, 8 causes a gradual deceleration of the striking head so that the kinetic energy of the head can be dissipated via the deformation path and the head is not be re-accelerated forward by an increasing spring energy of the seatback and the headrest, viewed in the direction of travel.

Transverse ribs 12 that serve for the arrangement of upholstery elements are disposed at the base 2. The first support body 5 has longitudinal webs 10 by means of which it is reinforced in order to prevent as excessive deformation of the first support body 5 during the course of the accident. After the end of the course of the accident, the head is no longer in engagement with the first support body 5, while the head experiences no negative acceleration (no HRV effect) due to the elastic deformation of the deformation elements 6a, 6b, 6c. The purely elastic deformability guarantees that the base body 1 after the accident again has the form represented in FIG. 1.

We claim:

1. A base body of a headrest of a vehicle seat, having
   a base, particularly for receiving a headrest carrier for disposing the headrest on a vehicle seat, and
   a support body having a support surface for a head,
   wherein the support body is connected to the base such that the support surface can be elastically adjusted relative to the base, wherein the support body comprises at least one longitudinal and/or transverse rib, wherein a second support body is disposed at the base elastically adjustable relative to the base at a distance from the first support body, and wherein the base and the support body are connected together via two elastically deformable deformation elements.

2. The base body according to claim 1, wherein the base and the support body, or the base, the support body and the deformation element are formed integrally.

3. The base body according to claim 1, wherein the deformation element comprises recesses.

4. The base body according to claim 1, wherein the base comprises a support structure formed by webs.

5. The base body according to claim 1, wherein the support body comprises reinforcement elements different from the longitudinal and/or transverse ribs.

6. The base body according to claim 1, wherein the second support body is formed integrally with the base.

7. The base body according to claim 1, wherein the second support body and the base are connected together via a deformation element.

8. The base body according to claim 1, wherein it is formed from a plastic.

9. The base body according to claim 1, wherein receptacles are molded at the base for mounting the headrest support.

10. A headrest of a vehicle seat having a base body according to claim 1.

11. The base body according to claim 8, wherein it is formed from a plastic free of glass fibers.

12. The base body according to claim 1, wherein the base comprises a support structure formed by transverse and/or longitudinal webs.

13. A headrest of a vehicle seat having a base body comprising
    a base, particularly for receiving a headrest carrier for disposing the headrest on a vehicle seat, and
    a support body having a support surface for a head,
    wherein the support body is connected to the base such that the support surface can be elastically adjusted relative to the base, wherein the support body comprises at least one longitudinal and/or transverse rib, wherein a second support body is disposed at the base elastically adjustable relative to the base at a distance from the first support body and wherein the second support body and the base are connected together via a deformation element.

* * * * *